United States Patent [19]
Newell et al.

[11] Patent Number: 5,525,846
[45] Date of Patent: Jun. 11, 1996

[54] MANUALLY ACTUATABLE INTEGRATED CONTROL MODULE AND METHOD OF MAKING SAME

[75] Inventors: Edwin R. Newell, Wake Forest; Michael B. Carter, Durham; Jackie C. Sullivan, Knightdale, all of N.C.

[73] Assignee: Square D Company, Palatine, Ill.

[21] Appl. No.: 282,839

[22] Filed: Jul. 29, 1994

[51] Int. Cl.$^6$ ........................................ H02B 1/24
[52] U.S. Cl. .............................. 307/125; 29/831; 29/832; 29/833; 361/399; 361/707
[58] Field of Search ........................... 307/125; 361/752, 361/781, 686; 340/712; 364/708.1; 455/90; 29/831, 832, 833, 836, 834, 741

[56] References Cited

U.S. PATENT DOCUMENTS

| | | | |
|---|---|---|---|
| 3,770,925 | 11/1973 | Nelson et al. | 200/168 |
| 4,306,123 | 12/1981 | Taylor | 200/16 A |
| 5,074,798 | 12/1991 | Carter | 439/72 |
| 5,146,615 | 9/1992 | Hodsdow et al. | 455/90 |
| 5,155,664 | 10/1992 | Holterman et al. | 361/399 |
| 5,426,564 | 6/1995 | Hsu | 361/707 |

*Primary Examiner*—Wiliam M. Shoop, Jr.
*Assistant Examiner*—Albert Paladini
*Attorney, Agent, or Firm*—Larry I. Golden; David Russell Stacey; Larry T. Shrout

[57] ABSTRACT

A manually actuatable integrated contact module connecting to an output access module by means of a common communications link. The integrated contact module has an electrical contact, a logic circuit, a communications circuit and a communications terminal mounted on a common printed circuit board. The printed circuit board provides communication between the electrical contact and the logic circuit, between the logic circuit and the communications circuit, and between the communications circuit and the communications terminal. The printed circuit board is enclosed within a protective housing. A contact operator is slidably mounted with respect to the printed circuit board such that it is partially enclosed within the housing and movable between a first position and a second position. An operator interface device in mounted on one side of a control panel and the integrated contact module is attached to the operator interface device an the opposite side of the control panel such that the operator interface device is in communication with that portion of the contact operator outside the protective housing. The contact operator, in response to movement of the operator interface device, causes the contact to change state thereby initiating a signal to be processed by the logic circuit and communications circuit prior to being placed on the common communications link.

28 Claims, 10 Drawing Sheets

MANUALLY ACTUATABLE INTEGRATED CONTROL MODULE AND METHOD OF MAKING SAME

FIELD OF THE INVENTION

This invention relates to a method of making a manually actuatable control panel assembly employing input access modules for reporting the status of a manually actuatable contact block to a remotely located output access module on a shared communication link to activate an output device and an integrated input contact module for use in such an assembly.

BACKGROUND OF THE INVENTION

Systems for remotely controlling electrical devices from a manual control panel are well known. In some systems employing point-to-point input/output, or I/O, architecture, each of a plurality of manually activated operator interface devices, such as a push button, a key operator, a joy stick, or a rotary selector can be used to operate an associated contact block having one or more electrical contacts. Each contact block is electrically connected to an associated remotely located output device, such as a pilot light, a contactor, an overload relay or other electrically controllable device. These individual point-to-point connections between each contact block and its associated output device causes the task of making a manual control panel assembly extremely labor intensive and costly.

In order to reduce the labor costs as well as the cost of materials, it is now known to construct manual control panel assemblies wherein a number of operator interface controlled contact blocks are connected to a number of remotely located output devices by a single time division multiplexing communications link shared by all of the input and output modules of the system. In this system each contact block is electrically connected to an associated input access module which provides access to the multiplexing communications link over which the status of that particular contact block is conveyed to an associated output access control module. The output access control module is electrically connected to an associated output device which is ultimately controlled by the associated operator interface device at the control panel. This mode of operation is herein defined as the STAND-ALONE-MODE or PEER-TO-PEER mode where one contact block and its associated input access module sends a signal directly to its associated output access module for controlling the associated output device. This system could also be used in a HOST mode where the signal from the input access module is sent to a computer or other device having a CPU or means for adding simple logic functions such as AND, NAND, OR or NOR to the signal. A control system employing a time division multiplex common communication link is shown and described in U.S. Pat. No. 4,808,994 issued on Feb. 28, 1989 to Riley for "Logic Interchange System" and in the improvement patent application Ser. No. 08/099,788 filed Jul. 30, 1993 assigned to the assignee of the present invention and incorporated herein by reference. In this type of system, both the input and output access modules contain a communications circuit for communicating on the time division multiplexed common communications link and a circuit for implementing basic logic functions such as AND, NAND, OR and NOR. Because the logic circuit is included in each of the input and output access modules the system can operate in either the STAND-ALONE-MODE or the HOST mode. The state of the contact block is received by the input access module where it is processed and passed onto the communications link in the proper time slot to be received by the associated output access module. The output access module interprets the signal and passes the appropriate signal on to the output device for action.

It is also known to convey contact block status information and input access module mode status between a number of input access modules and their associated output access modules via network signaling. An example of such a network signaling control system is the LonWorks system which is assembled from components manufactured by Echelon Company of Palo Alto, Calif. The LonWorks system also comprises an ASIC which produces the signals for the network and can also be programmed with software to produce the basic logic functions of AND, NAND, OR and NOR.

The use of either of these two types of distributed I/O architecture will eliminate the point-to-point wiring between each contact block and its associated output device. However, in the current state of the art, a point-to-point connection is still required between the contact block and some type of input access module associated with the contact block and between the output device and some type of output access module associated with the output device. Each connection between an access module and a contact block or output device requires at least two separate wires and sometimes more. In control panel construction the operator interface device is installed on the outside of the panel cover and the contact block is on the inside of the panel cover. The operator interface device and contact block are in communication with each other such that manually operating the operator interface device will change the state of the electrical contacts within the contact block. The input access module is generally placed at an easily accessible location inside the control panel such as the back wall of the panel enclosure. This is usually some distance away from the contact block. It is also common for a control panel to include a number of pilot lights, each indicating the status of an associated output device controlled by its associated operator interface device. These pilot lights are actually output devices and therefore require a connection to the common communications link. Each pilot light requires a separate output access module and wiring between the output access module and the pilot light. The wiring between the contact blocks, pilot lights and their associated input and output access module must be of sufficient length to permit cover removal when inspection, maintenance or trouble shooting is required. This generally requires several feet of wire for each connection. Control panels which have a large number of operator interface devices and pilot lights are difficult to wire and assemble due to the many wires required. Thus, even with the common communication link between input access modules and output access modules the control panel itself still requires considerable wiring time and material. The physical size of the control panel enclosure is also a consideration. For each contact block and pilot light in the control panel, one input or output access module is required. The input and output access modules are at least the same size as the contact blocks and pilot lights and in many cases much larger. Therefore the volume of the control panel must be of sufficient size to enclose all of the input and output access modules and the wire required for connecting them to their respective contact blocks and pilot lights.

SUMMARY OF THE INVENTION

It is an objective of this invention to provide a method of making and assembling a manual control panel assembly which greatly reduces the labor intensive wiring and assembly problems associated with control panels employing conventional contact blocks, pilot light assemblies, input access modules and output access modules, while, at the same time, making trouble shooting and maintenance of the control panel easier.

It is also an object of this invention to reduce the number of individual components required for the system by approximately one half while at the same time keeping the physical size and general shape of the integrated contact module and integrated pilot light module substantially the same as that of a non-integrated contact block or non-integrated pilot light module. This objective will permit the integrated modules to be used with existing devices and as direct replacement for existing devices without requiring additional labor and components.

These objects of the invention are achieved in part by provision of a method of making a manual control panel assembly, comprising the steps of (1) preassembling a manually actuatable contact block, having an electrical contact movable between an open state and a closed state, in combination with an input access module to form an integrated contact module, (2) mounting the integrated contact module to the control panel and (3) connecting the mounted integrated contact module to a communications link at the control panel for communication with an output access module at a location remote from the control panel to control an associated output device in accordance with the change of state of the contact.

Preferably, the step of preassembly includes the steps of (1) mounting the manually operable electrical contact of the contact block and circuits for forming simple logic functions and communications functions from the input access module on a printed circuit board; (2) placing a slidable contact operator inside the integrated contact module housing; and (3) placing the printed circuit board inside the integrated contact module housing such that the slidable contact operator will change the state of the contact when it is moved between a first position and a second position. The printed circuit board includes connections for providing electrical communication between the electrical contacts and the logic and communications circuits.

The step of mounting preferably includes the step of (1) mounting an operator interface device on one side of the control panel cover and (2) attaching the integrated contact module to the operator interface device on an opposite side of the control panel cover with the cover being sandwiched therebetween. The operator interface device is in communication with the slidable contact operator such that manual operation of the operator interface device will cause the slidable contact operator to change the state of the contact on the printed circuit board.

The object of the invention is also achieved by providing a manually actuatable integrated contact module comprising a housing; a printed circuit board enclosed within the housing; an electrical contact selectively movable between an open state and a closed state and mounted on the printed circuit board, means for manually changing the state of the contact, the means being partially enclosed within the housing; a logic circuit in electrical communication with the contact for providing a logical function in response to the change of state of the contact; a communications circuit in electrical communication with the logic circuit for producing a signal in response to the logic circuit; a communications terminal in electrical communication with the communications circuit for providing an external connection to a communications link; and means for attaching the integrated contact module to an operator interface device.

It is also preferable that the integrated contact module include a second contact having a normal state opposite that of the first contact and that the second contact be in electrical communication with a second logic circuit which in turn is in electrical communication with the communications circuit which provides a signal in response to the state of the second contact to the communications terminal.

The object of the invention is further accomplished by providing an integrated pilot light module comprising a housing; a printed circuit board enclosed within the housing; a communications terminal for external connection to a communications link, a communication circuit in electrical communication with the communications terminal for receiving and interpreting signals addressed to the pilot light module, a logic circuit in electrical communications with the communications circuit for performing basic logic functions in response to the signal from the communications circuit, an electronic switching device in electrical communications with and responding to signals from the logic circuit; and a pilot light in electrical communications with and selectively changeable between an OFF and an ON state by the electronic switching device.

Other features and advantages of the invention will become apparent to those skilled in the art upon review of the following detailed description, claims and drawings.

Figure 1:
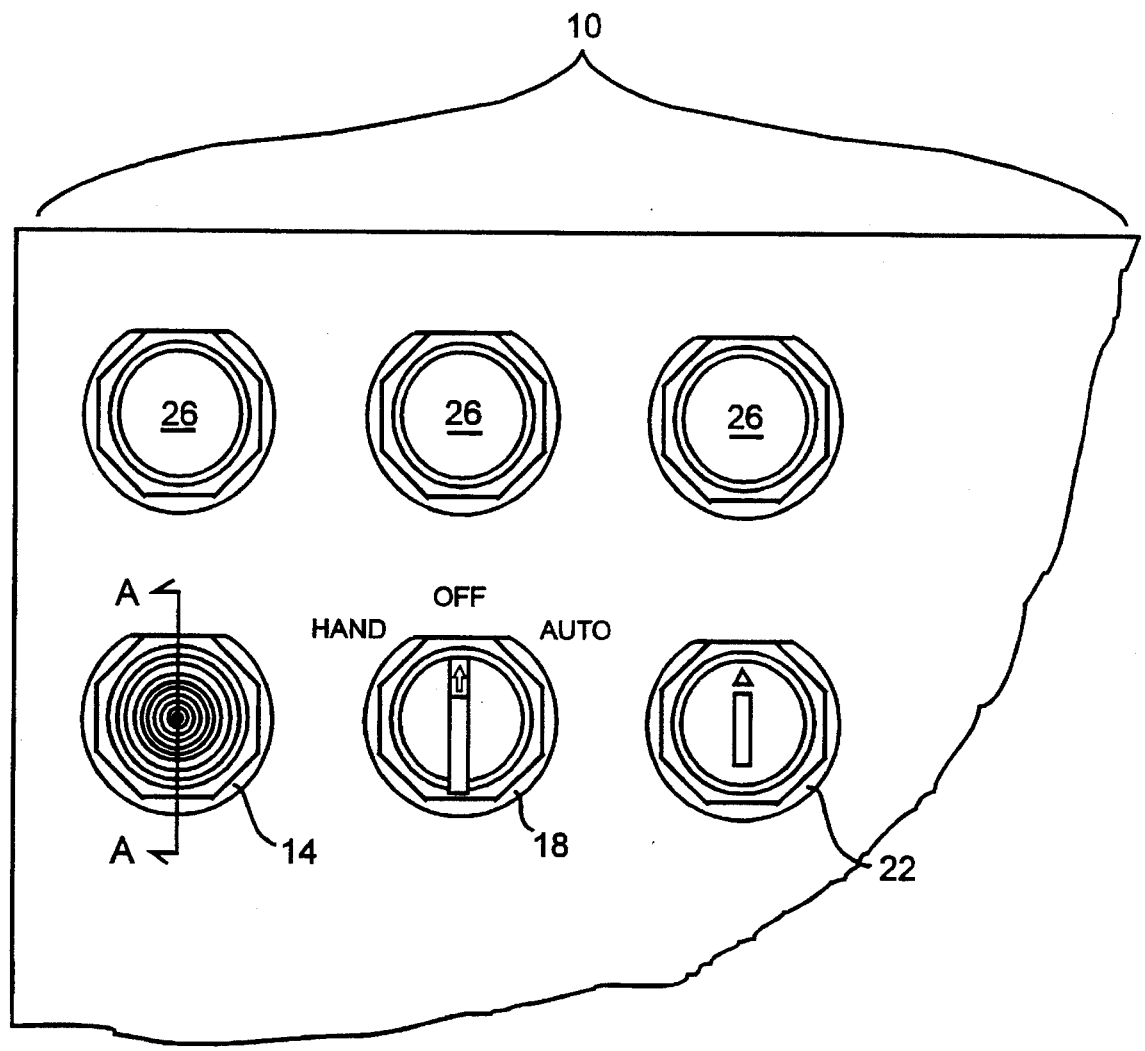
FIG. 1 is a front view of a typical control panel having push buttons and pilot lights.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

Referring to FIG. 1, it can be seen that a typical control panel assembly as generally indicated by reference numeral 10 includes a number of manual operator interface devices such a push button operator 14, a rotary selector 18 or a key operator 22. These operator interface devices manually interface with contact blocks which provide the means to control a number of output devices at locations remote from the control panel assembly 10. It is also common for the control panel assembly 10 to include a number of output devices such as pilot lights 26 which indicate the status of associated remotely located output devices controlled by the operator interface devices.

Figure 2:
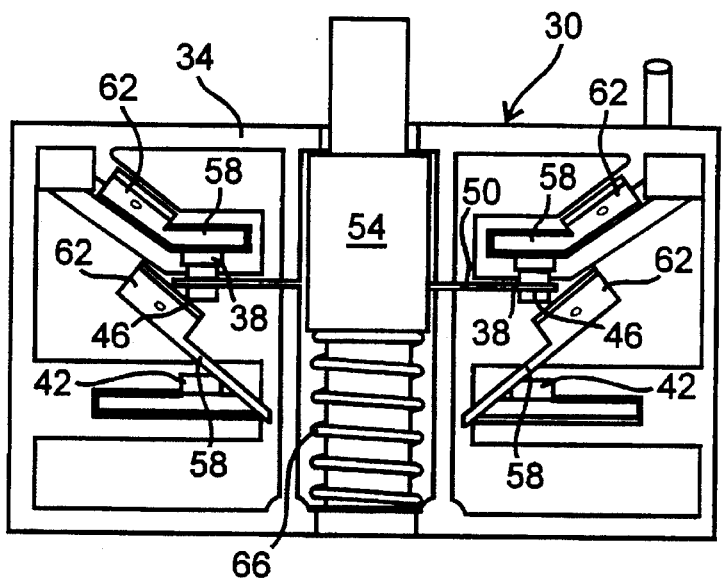
FIG. 2 is a interior view of a contact block of the prior art with the first contact closed and the second contact open.
Figure 3:
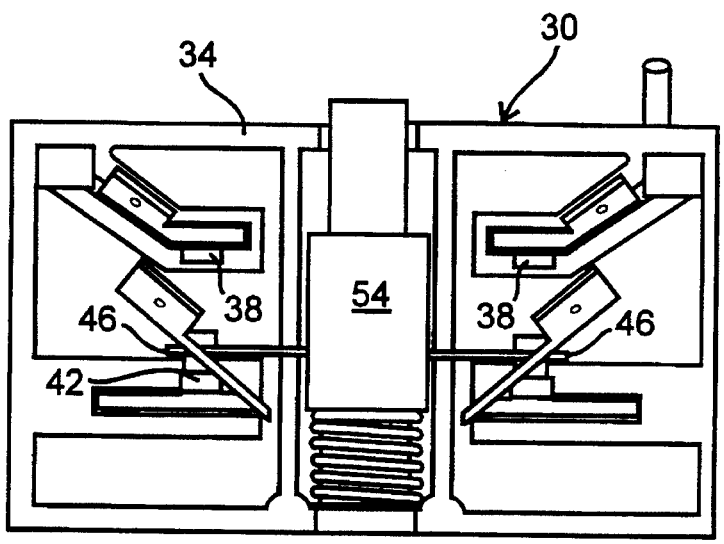
FIG. 3 is an interior view of a contact block of the prior art with the first contact open and the second contact closed.
Figure 4:
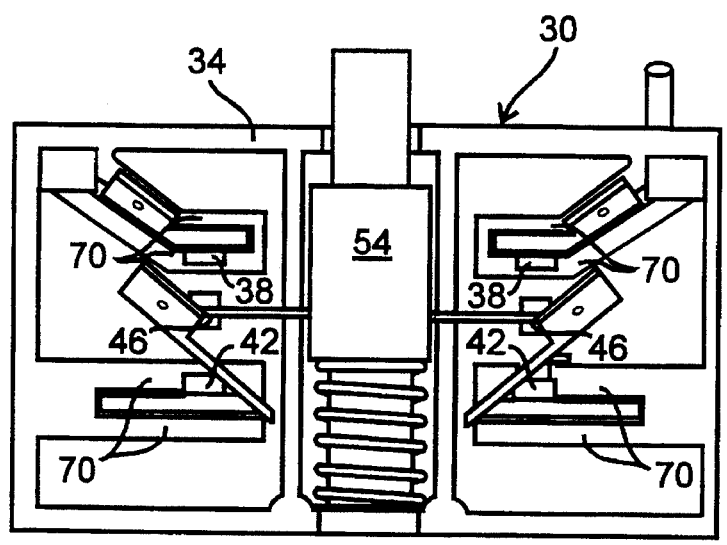
FIG. 4 is an interior view of a contact block of the prior art with the both first and second contacts open.

Referring now to FIG. 2, a conventional contact block 30 of the prior art is shown, including a housing 34 enclosing a first set of spaced apart stationary contacts 38, a second set of spaced apart stationary contacts 42, a set of movable contacts 46 electrically connected together by a bridge 50 which is attached to a slidably movable shaft 54 and bussing 58 between the stationary contacts 38 and 42 and external electrical terminals 62. The slidable shaft 54 is normally biased to a first position by a spring 66 and manually movable to a second position. In the first position, the movable contacts 46 are in electrical contact with the first set of stationary contacts 38 thereby making them normally closed and therefore the second set of stationary contacts 42 are normally open. By manually moving the slidable shaft 54 from the first position to the second position, as shown in FIG. 3, the movable contacts 46 are placed in electrical contact with the second stationary contacts 42 making them closed and thereby opening the first set of stationary contacts 38. As shown in FIG. 4, at an interim position between the first and second positions both first and second stationary contacts, 38 and 42 respectively, are open. This type of contact block construction requires structural support components 70, integrally formed from portions of the inside of the contact block housing 34, for mounting and supporting the stationary electrical contacts 38 and 42 and the associated bussing 58 from those contacts to their associated external wiring terminals 62. Accordingly, making an integrated contact module of the present invention using this type of construction would require a significant increase in the housing size in order to enclose a printed circuit board with electrical components and the required electrical connections between the contacts, the printed circuit board and the external wiring terminals.

Figure 5:
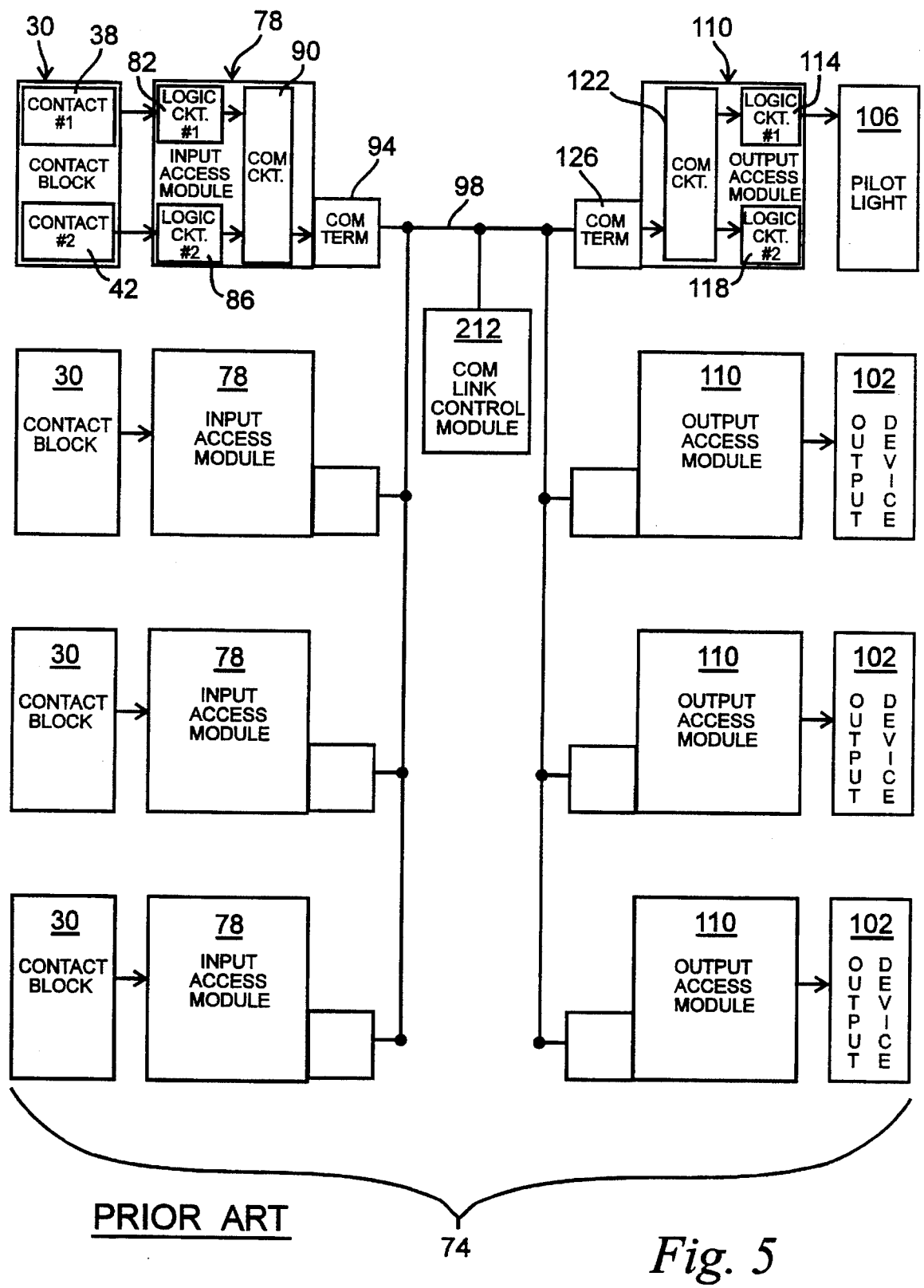
FIG. 5 is a block diagram of the components required to assemble a control panel using conventional contact blocks with conventional input and output access modules.

Referring now to FIG. 5, which illustrates in block diagram form, a conventional manually actuatable contact block 30 and the components of a control panel system, generally indicated by reference numeral 74, to which the contact block 30 is connected. The system 74 generally includes a number of contact blocks 30, each having a first contact 38 and a second contact 42. The contact block 30 is electrically connected to an input access module 78 which includes a first logic circuit 82, a second logic circuit 86, a communications circuit 90 and a communications terminal 94 for connecting to a common communications link 98. A number of output devices 102 such as a pilot light 106, or other electrically controllable devices such as contactors and relays, each associated with a particular contact block 10 and input access module 58 are electrically connected to an associated output access module 110. Each output access module 110 includes a first logic circuit 114, a second logic circuit 118, a communications circuit 122 and a communications terminal 126 for connecting to the common communications link 98. In a control panel system 74 as described above, the electrical connection between each contact block 30 and its associated input access module 78 and between each output access module 110 and its associated output device 102 must be hard wired by the panel assembler. It should be noted that since two logic circuits are included in each output access module 110, two output devices 106 can be controlled by a single output access module 110.

Figure 6:
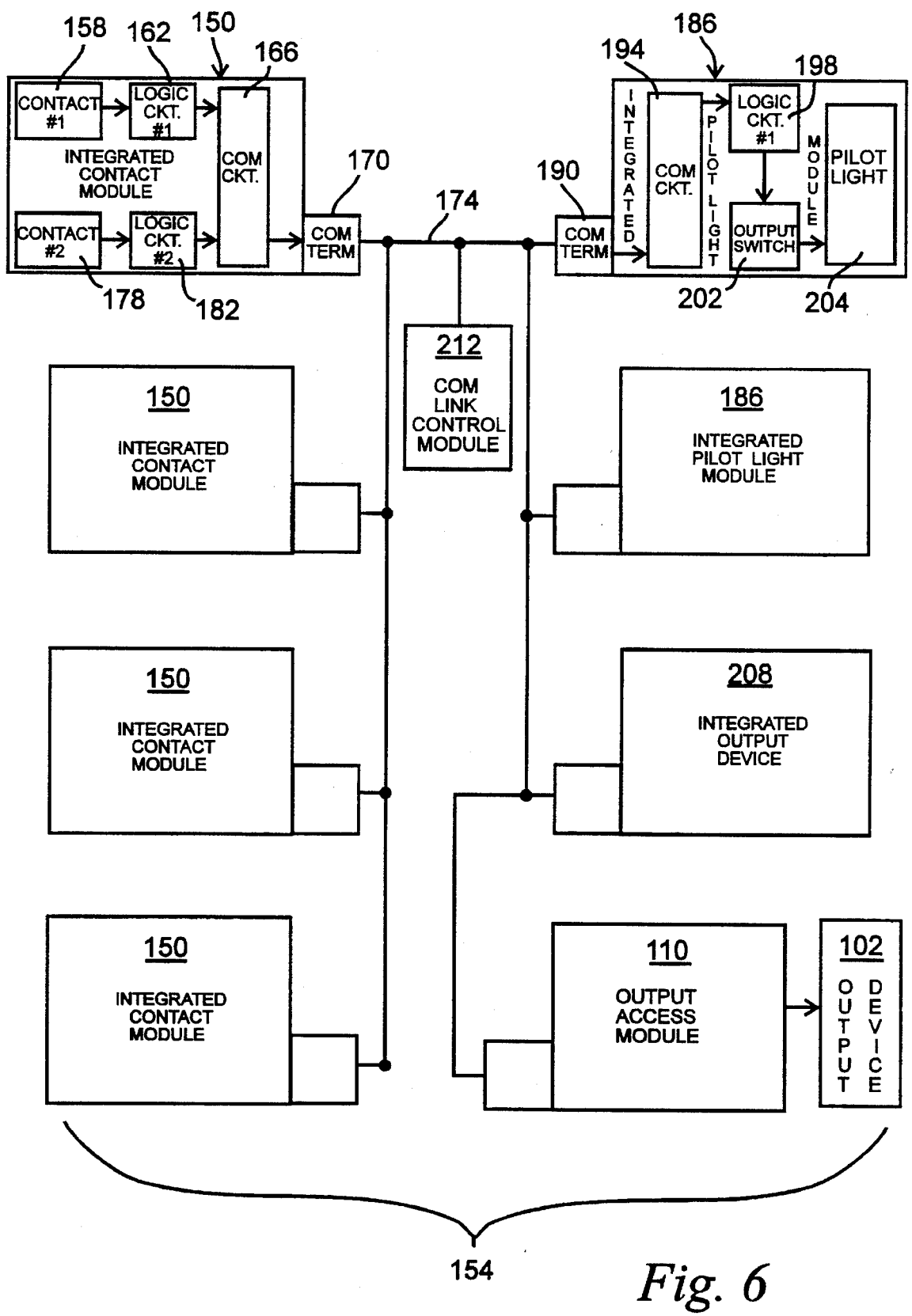
FIG. 6 is a block diagram of the components required to assemble a control panel using integrated contact modules and integrated output devices of the present invention.

Referring now to FIG. 6, which illustrates in block diagram form, a manually actuatable integrated contact block 150 constructed in accordance with the present invention and the components of a control panel system, generally indicated by reference numeral 154, to which the integrated contact block 150 is connected. The system 154 generally includes a number of integrated contact modules 150, each having a first contact 158, a logic circuit 162, a communications circuit 166 and a communications terminal 170 for connecting to a common communications link 174. The integrated contact modules 150 preferably include a second contact 178 and a second logic circuit 182. A number of output devices 102 such as pilot lights, contactors, relays or other electrically controllable devices, each associated with a particular integrated contact module 150 are electrically connected to an associated output control module 110 as described above. As an alternative to the output access devices 102 and pilot lights 106 an integrated pilot light module 186 can be used to further reduce control panel wiring and assembly time. The integrated pilot light module 186 includes a communications terminal 190, a communications circuit 194, a logic circuit 198, an output switch 202 and a pilot light 204. The communications terminal 190, communications circuit 194, logic circuit 198, and output switch 202 can also be integrated into other electrically controllable output devices such as contactors or relays to form integrated output devices 208. These integrated output devices 208 eliminate the need for hard wiring between an output access module 110 and its associated output device 102.

The system as described above can be used in either a time division multiplexed system or a network signaling control system. In some time division multiplexed systems a communications link control module 212 can be required to provide the clock timing circuit for the system. In this type of system the communications link control module 212 can also be programmed to place the system 154 in either the STAND-ALONE mode or the HOST mode. In a network signaling control system, the logic circuits and communications circuits are software programmable to operate at a particular address, form simple logic functions and to operate in either the STAND-ALONE mode or the HOST mode. In the network system a communications control module 212 is not required.

Figure 7:
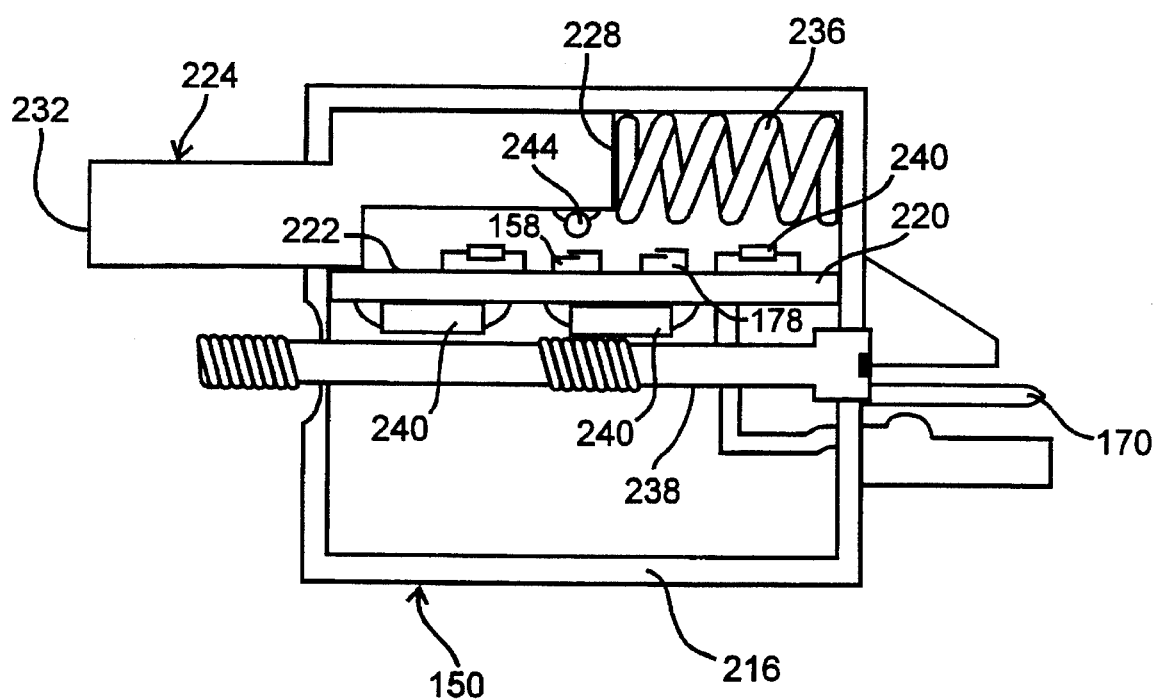
FIG. 7 is an interior view of an integrated contact module constructed in accordance with the present invention.

Referring now to FIG. 7, the integrated contact block 150 includes a housing 216 which encloses and protects a printed circuit board 220 which has a first generally flat side 222. The first and second contacts, 158 and 178 respectively, are mounted on the first side 22 such that one is spaced apart from the other. The first and second logic circuits, 162 and 182 respectively, the communications circuit 166 and the communications terminal 170 are also mounted on the printed circuit board 220. A contact operator 224 is partially enclosed within the housing 216 such that a first end 228 in enclosed within the housing 216 and a second end 232 extends outside the housing 216. The contact operator 224 is slidably mounted such that it is moveable between a first position and a second position. The first end 228 is spaced apart from the first surface 221 such that it moves in a plane generally parallel to the first surface 221 as the contact operator 224 is moved between its first and second positions. The contact operator 224 is normally biased to the first position by a spring 236 and moved to the second position by manually moving the second end 232. In order for the integrated contact module 150 to maintain a physical size and shape comparable to the non-integrated contact block 30, the electrical and mechanical components contained within the housing 216 must be very small. The printed circuit board 220 is two sided board having a second generally flat side 238 on which other electrical components 240 such as integrated circuits, resistors, etc. can be mounted to conserve space. The first and second contacts, 158 and 178 respectively, are normally open miniature reed switches such as catalog number MITI-3 manufactured by Hamlin. These contacts 158 and 178 are operated by a small permanent magnet 244 such as catalog number 27941 manufactured by Arnold Engineering Company. The magnet 244 is fixedly attached to the contact operator at a point near its first end 122. The logic and communications circuits are implemented in an application specific integrated circuit or ASIC. The communications terminal 170 is of the modular type for mounting on a printed circuit board such as catalog number MLAS100-5-C manufactured by Panduit.

Figure 8:
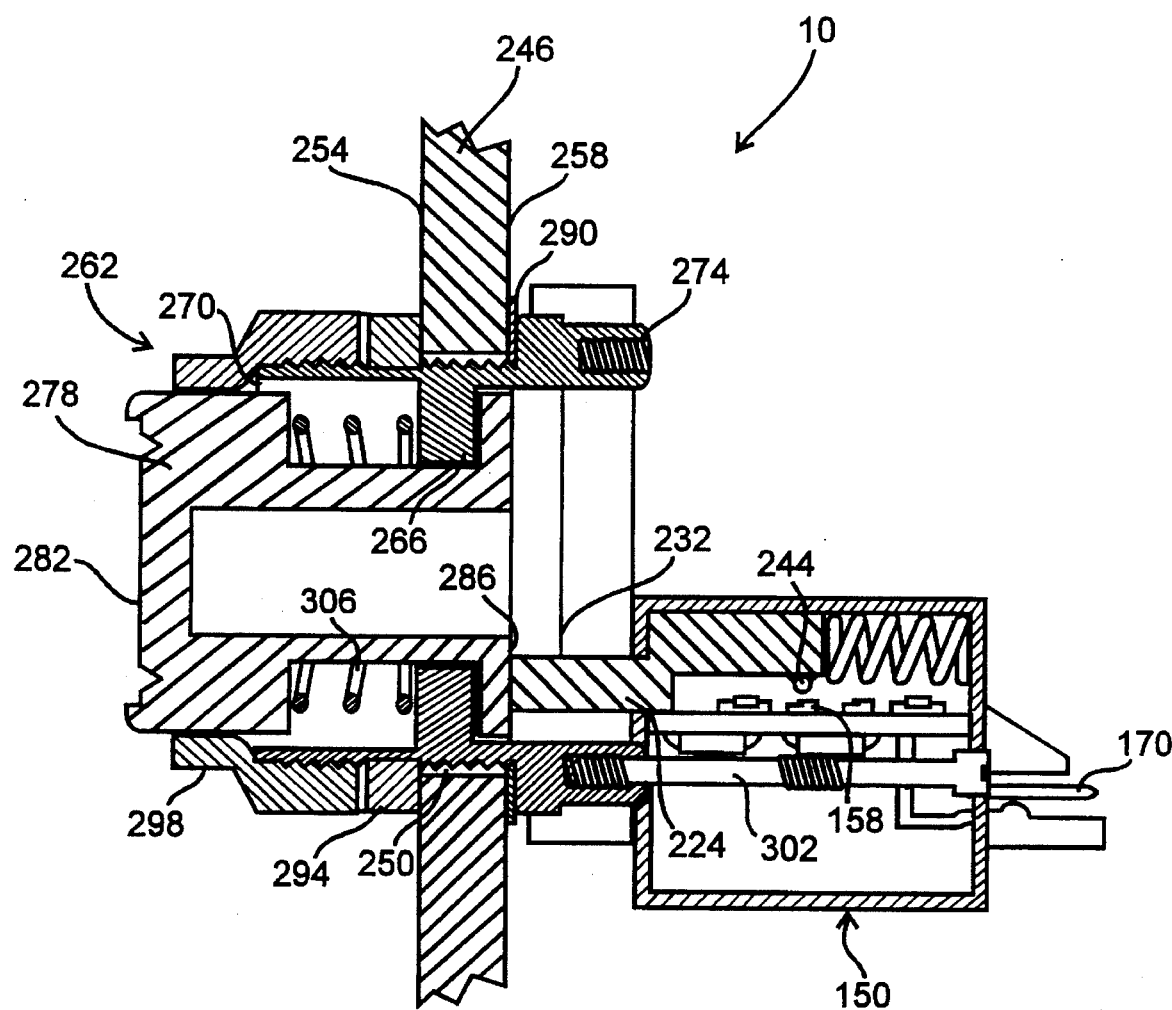
FIG. 8 is a cross-sectional view taken generally along line A—A of FIG. 1 showing an integrated contact module constructed in accordance with the present invention and a push button operator interface in the normal position (first contact closed second contact open).

Referring now to FIG. 8 for the steps of constructing a control panel assembly 10 according to the present invention, it can be seen that the control panel assembly 10 includes a cover 246 having holes 250 through which the operator interface devices are mounted. For the purpose of simplification, the push button operator 14 will be used to illustrate the control panel assembly steps and operation. The cover 246 is generally flat and has an outside surface 254 and an inside surface 258. The hole 250 provides a means of communication between the outside surface 168 and the inside surface 258 such that operator interface devices can be installed on the cover 246. A push button operator assembly 262 includes a housing 266 having a push button end 270 and a contact block end 274, a plunger 278 slidably mounted inside the housing 266 having a push button end 282 and an operator surface 286. The push button end 270 of the housing 266 is dimensioned to pass through the hole 250 while the contact block end 274 is larger that the hole 250 and therefore cannot pass through. The push button operator assembly 262 is attached to the cover 246 by passing the push button end 270 through the hole 250 from the inside surface 258 such that it extends outward past the outside surface 254. The contact block end 274 of the housing 266 presses against a sealing washer 290 placed between the inside surface 258 of the cover 246 and the contact block end 274 of the housing 266. An anti-twist washer 294 is slidably received over the push button end 270 of the housing 266 such that it engages the cover 246. A retaining bushing 298 is then threadably received over the push button end 270 of the housing 266, thereby tightly clamping the cover 246 between the anti-twist washer 294 and bushing 298 on the outside surface 254 and the sealing washer 290 and contact block end 274 of the housing 266 on the inside surface 258. Thus the push button assembly 262 is securely attached to the cover 246 of the control panel assembly 10. The integrated contact module 150 is now positioned against the contact block end 274 of the housing 266 such that the second end 232 of the contact operator 224 is in close proximity with the operator surface 286 of the plunger 278 and then attached to the housing 266 by a screw 302. The common communications link 174 is then connected to the integrated contact module 150 at the communications terminal 170 thereby completing the installation of the push button operator assembly 262 and the integrated contact module 150.

As can be seen in FIG. 8, the plunger 278 is normally biased to a first position by a spring 306. In this position the contact operator 224 is also in its normally biased first position wherein the magnet 244 on the contact operator 224 is positioned immediately adjacent the first contact 158, thereby causing the first contact 158 to be in a closed condition.

Figure 9:
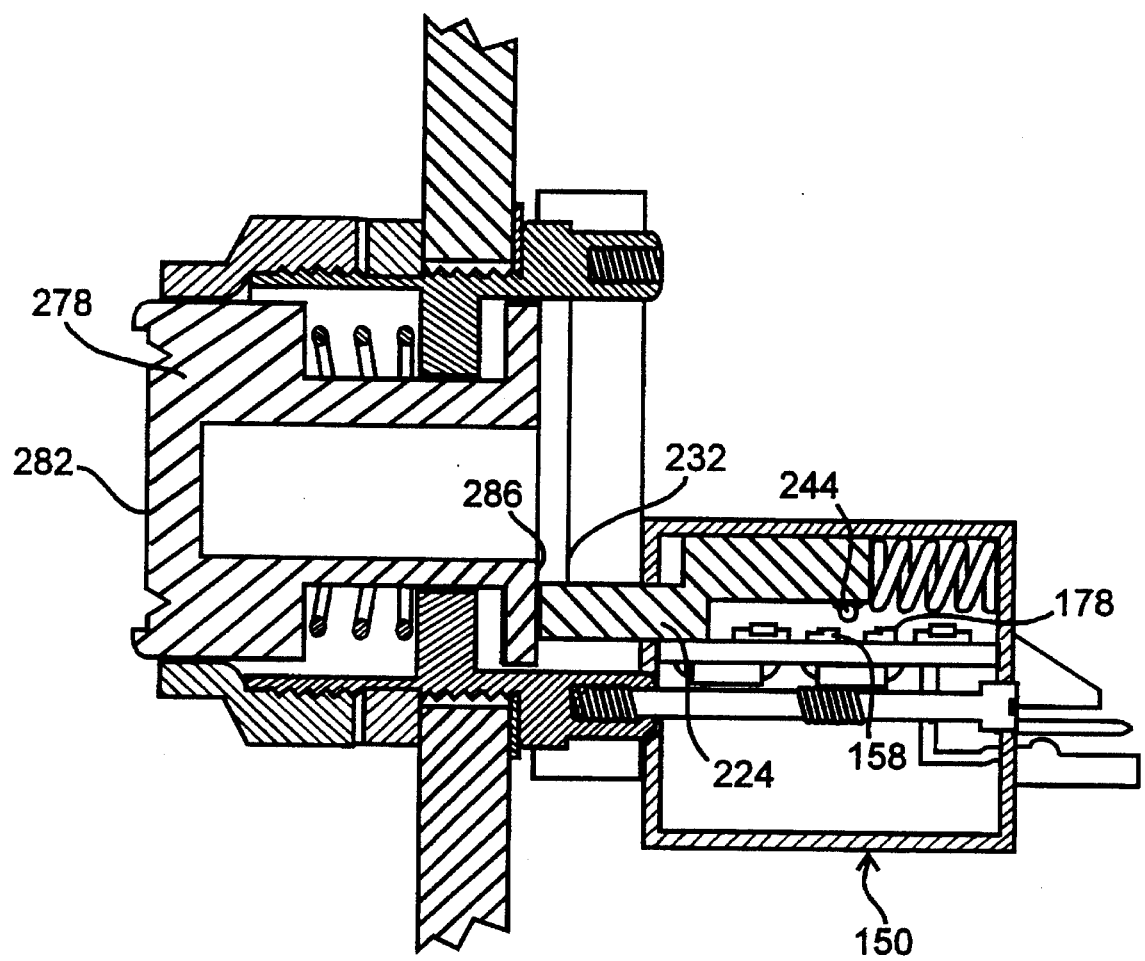
FIG. 9 is a cross-sectional view taken generally along line A—A of FIG. 1 showing an integrated contact module constructed in accordance with the present invention and a push button operator interface in the intermediate position (both contacts open).
Figure 10:
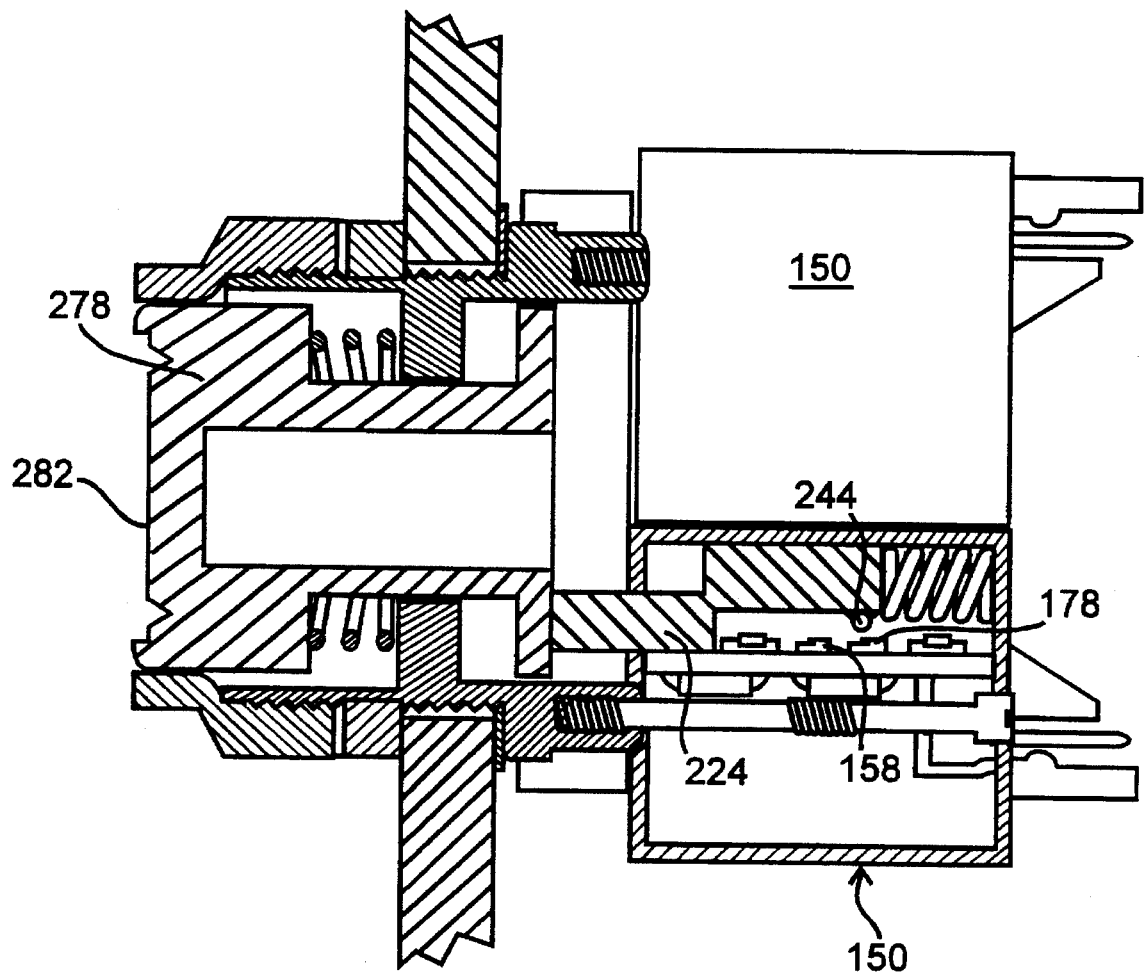
FIG. 10 is a cross-sectional view taken generally along line A—A of FIG. 1 showing an integrated contact module constructed in accordance with the present invention and a push button operator interface in the fully depressed position (first contact open second contact closed).

Referring now to FIG. 9, as the push button end 282 is pressed by the machine operator, the plunger 278 moves toward a second position thereby causing the operator surface 286 to engage the second end 232 of the contact operator 224 causing it to move from its normally biased position toward its second position. At an interim point between the first and second positions of the plunger 278 and the contact operator 224, as shown in FIG. 9, the magnet is between the first and second contacts, 158 and 178 respectively, thereby allowing both contacts to be in their normally open condition. As the push button end 282 is fully depressed, as shown in FIG. 10, the plunger 278 and contact operator 224 reach their second position. When the contact operator 224 is in its second position the magnet 244 is positioned immediately adjacent the second contact 178 thereby causing it to be in the closed condition. The change in state of each of the first and second contacts, 158 and 178 respectively, is communicated to their respective logic circuits 162 and 182 and from the logic circuits 162 and 182 to the communications circuit 166 and then to the communications terminal 170 and on to the communications link 174. The signal is then received by the appropriate integrated pilot light module 186, integrated output device 208 or output access module 110 for action at the output device. A second integrated contact block 150 can be attached to the push button operator assembly 262 or other operator interface device as shown in FIG. 10.

Figure 11:
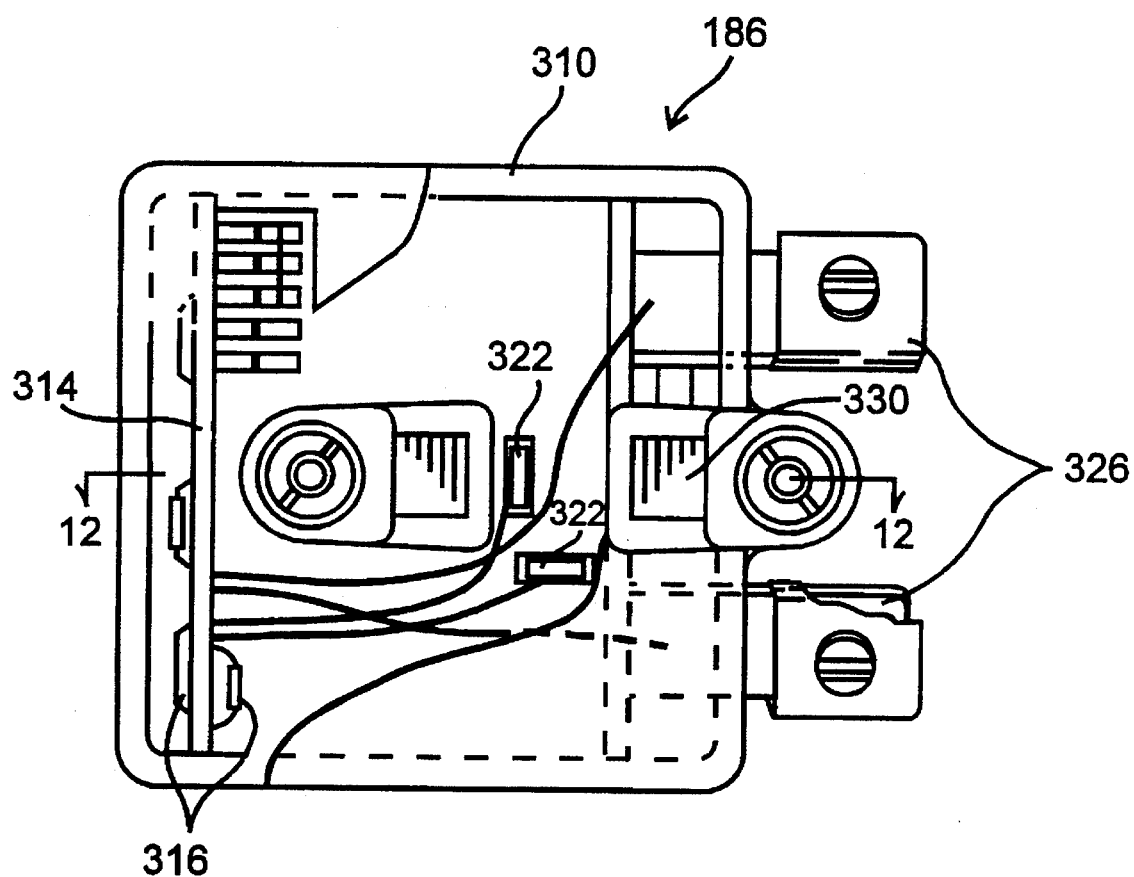
FIG. 11 is a cutaway view of the interior of an integrated pilot light module constructed in accordance with the present invention.

Referring now to FIG. 11 the integrated pilot light module 186 also includes a housing 310 which encloses a printed circuit board 314 on which the communications terminal 190, communications circuit 194, logic circuit 198, and output switch 202 are attached and in communication with one another. The circuit board 314 is two sided such that electrical components 316 such as integrated circuits resistors and transistors can be mounted on both sides to conserve space within the housing 310. The output switch 202 is preferably a switching transistor or relay and is in electrical communication with the pilot light 204 such that it can be turned ON or OFF in response to a signal from the logic circuit 198.

Figure 12:
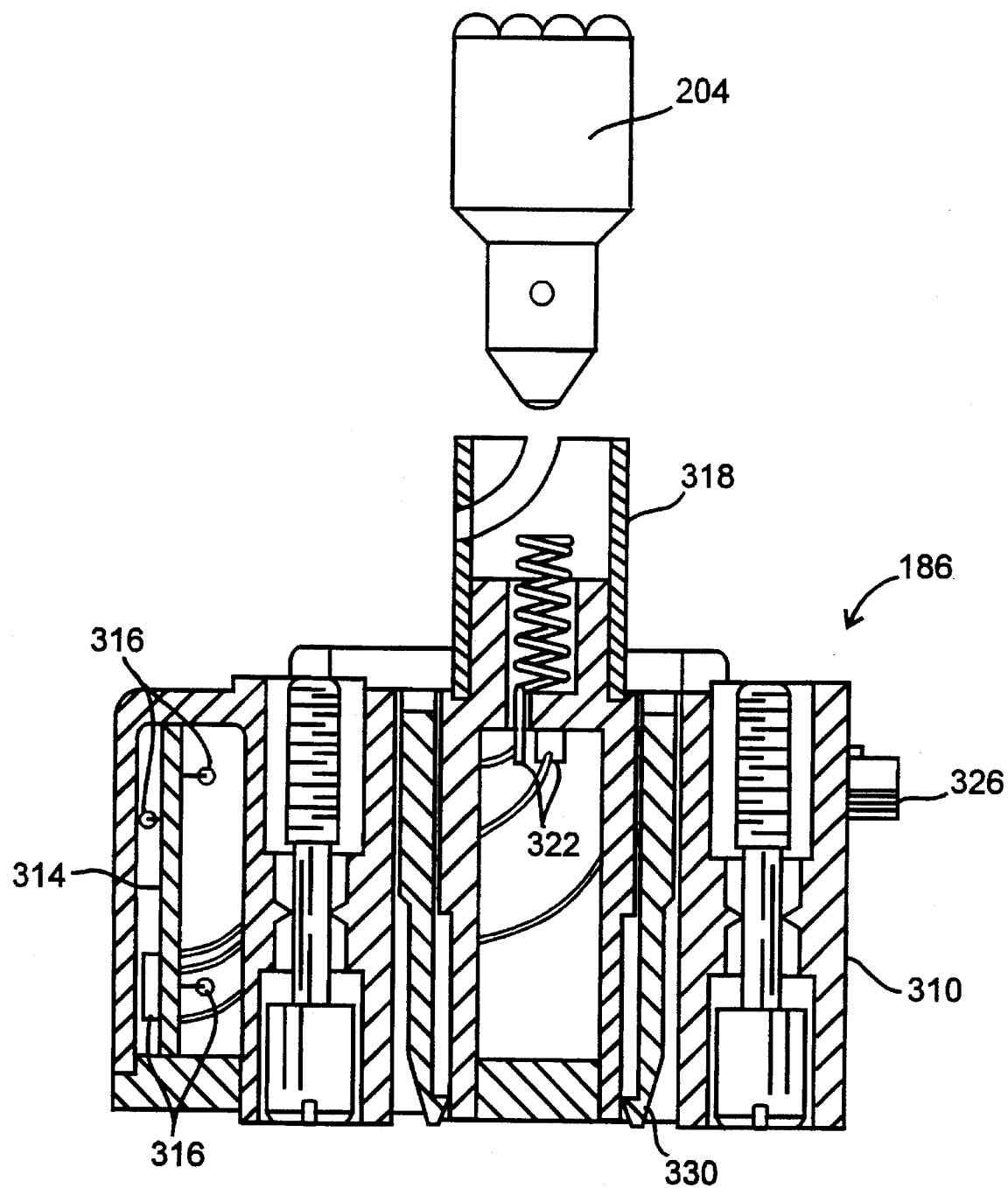
FIG. 12 is a cross-sectional view taken along line 12—12 of FIG. 11 showing an integrated pilot light module constructed in accordance with the present invention.

Referring now to FIG. 12, the integrated pilot light module 186 preferably incorporates a miniature bayonet base 318 for receiving the pilot light 204. The base is attached to the housing 310 such that terminals 322 pass through the housing 310 thereby providing a means for electrically connecting the pilot light 204 to the output switch 202. The pilot light 204 can be either a commercially available LED module having a bayonet base or a low voltage incandescent light having a bayonet base. When an LED module is used, no external power source is required; however, the low voltage incandescent light requires a pair of external power terminals 326 which are in electrical communication with the output switch 202 on the printed circuit board 314 such that the output switch 202 controls the power supplied to the pilot light 204. The integrate pilot light module 186 can be attached to a pilot light lens assembly, shown in FIG. 1, or to an illuminated operator interface device. A translation pin 330 passes through the pilot light housing 310 to communicate the manual movement of the operator interface device to a conventional contact block 30 or integrated contact module 150 which can be attached to the back of the pilot light 186.

The printed circuit board 314 on which the communications terminal 190, communications circuit 194, logic circuit 198, and output switch 202 can be integrated into other output devices 102 for control of the output device 102.

We claim:

1. A method of making a manual control panel assembly, comprising the steps of:
   preassembling a manually actuatable electrical contact in combination with an input access module to form an integrated contact module;
   mounting a manually operable operator interface device on said control panel;
   attaching said integrated contact module to said operator interface device; and
   connecting said integrated contact module to a common communications link at the control panel for communication with an output access module spaced apart from said control panel for controlling an associated output device in response to manual operation of said contact.

2. The method of claim 1 wherein the step of preassembly include the steps of:
   mounting said manually actuatable electrical contact on a printed circuit board;
   mounting a communications circuit, a logic circuit, and a communications terminal of the input access module on said printed circuit board, said printed circuit board providing electrical communication between said contact and said logic circuit, between said logic circuit and said communications circuit, and between said communications circuit and said communications terminal.

3. The method of claim 2 wherein the step of preassembly further include the step of:
   mounting a second manually actuatable electrical contact and a second logic circuit associated with said second contact on said printed circuit board, said printed circuit board providing electrical communication between said second electrical contact and said second logic circuit and between said second logic circuit and said communications circuit.

4. The method of claim 2 wherein the step of preassembly includes the steps of:
   mounting said printed circuit board inside a protective housing; and
   slidably mounting a contact operator partially within said housing such that said contact operator is movable into and out of a contact actuating position.

5. The method of claim 1 wherein the step of mounting include the steps of:
   mounting an operator interface device on one side of said control panel; and
   attaching said integrated contact module to said operator interface device on an opposite side of said control panel such that they are in communication with each other.

6. The method of claim 1 wherein the step of connecting includes the step of:
   attaching a connector or a common communications link to said communications terminal.

7. The method of claim 1 including the steps of:
   mounting a plurality of operator interface devices to said control panel;
   attaching a plurality of preassembled integrated contact modules to said operator interface devices; and
   connecting each said integrated contact module through said common communications link to a plurality of associated output access modules.

8. The method of claim 1 in which the steps of preassembly include the step of preassembling said manually actuatable integrated contact module with a multiplexing communication circuit for transmitting control signals responsive to said manually actuatable electrical contact to an output access module on a time division multiplexing basis.

9. The method of claim 1 in which the steps of preassembly include the step of preassembling said manually actuatable integrated contact module with an encoded network transmitting signal communication circuit for transmitting encoded control signals responsive to said manually actuatable electrical contact to an output access module on a network signaling basis.

10. A manually actuatable integrated contact module, comprising:
    a housing defining a hollow interior;
    a printed circuit board, mounted within said housing and having a first and a second generally flat surface;
    a contact operator, partially enclosed within said housing and slidably movable between a first position and a second position;
    a first electrical contact mounted on said first generally flat surface of said printed circuit board such that movement of said contact operator between said first and second positions will cause a change in state of said electrical contact;
    a first logic circuit mounted on said circuit board and in communication with said electrical contact such that a logical function can be produced in response to said change of state of said electrical contact;
    a communications circuit mounted on said circuit board and in electrical communication with said logic circuit, said communications circuit producing a control signal in response to said logical function; and
    a communications terminal mounted on said circuit board and in communication with said communications circuit, said communications terminal providing access to a common communications link such that said control signal can be placed on the common communications link for controlling an associated output device also having means for accessing the common communications link.

11. The manually actuatable integrated contact module of claim 10 wherein said circuit board is two sided such that electrical components can be placed on both or said first and second generally flat sides of said printed circuit board to conserve space.

12. The manually actuatable integrated contact module of claim 10 wherein said communications circuit is of the type providing communications signals for use on a time division multiplexing communications link.

13. The manually actuatable integrated contact module of claim 10 wherein said communications circuit is of the type providing communications signals for use on an encoded network communications link.

14. The integrated contact module of claim 10 wherein said contact operator further comprises:
   a first end enclosed within said housing, said first end is spaced apart from and slidably movable in a plane generally parallel to said first generally flat surface of said printed circuit board;
   a second end extending outward from said housing; and
   a magnet attached to said contact operator at a point near said first end, said magnet is adjacent to said first generally flat surface of said printed circuit board such that it is movable in a plane generally parallel to said first generally flat surface of said printed circuit board as said contact operator is moved between said first and second positions.

15. The integrated contract module of claim 14 wherein said first electrical contacts is a reed switch.

16. The contact operator of claim 14 wherein said contact operator is normally biased to said first position wherein said magnet is immediately adjacent said first contact thereby causing said first contact to be in a closed state.

17. The contact operator of claim 16 wherein in said second position said magnet is moved sufficiently away from said first contact thereby causing said first contact to be in an open state.

18. The manually actuatable integrated contact module of claim 14 wherein a second electrical contact is mounted on said first generally flat surface of said printed circuit board such that movement of said contact operator between said first and second positions will cause a change in state of said second electrical contact, said second electrical contact being spaced apart from said first electrical contact.

19. The integrated contact module of claim 18 wherein said second electrical contacts is a reed switch.

20. The manually actuatable integrated contact module of claim 18 wherein a second logic circuit is mounted on said circuit board and is in communication with said second electrical contact such that a logical function can be produced in response to said change of state of said second electrical contact, said second logic circuit is in communication with said communications circuit.

21. The contact operator of claim 18 wherein said contact operator is normally biased to said first position wherein said magnet is immediately adjacent said first contact thereby causing said first contact to be in a closed state and sufficiently away from said second contact thereby causing said second contact to be in an open condition.

22. The contact operator of claim 21 wherein in said second position said magnet is moved sufficiently away from said first contact thereby causing said first contact to be in an open state and immediately adjacent said second contact thereby causing said second contact to be in a closed condition.

23. The contact operator of claim 22 wherein at an interim position between said first and second positions said magnet is sufficiently away from both said first and second contacts thereby causing both said first and second contact to be in an open state.

24. An integrated pilot light module, comprising:
   a housing defining a hollow interior;
   a bulb socket, attached to the exterior of said housing and having terminals for connection to a power source within said hollow interior of said housing;
   a pilot light received in said bulb socket;
   a printed circuit board, mounted within said housing;
   a communications terminal mounted on said circuit board for providing access a common communications link;
   a communications circuit mounted on said circuit board and in electrical communication with said communications terminal, said communications circuit interpreting a control signal received from said common communications link;
   a logic circuit mounted on said circuit board and in communication with said communications circuit such that a logical function can be applied to the control signal interpreted by said communications circuit; and
   an output switch mounted on said circuit board and in communication with said logic circuit such that the state of said switch can be changed in response to said logical function applied to the control signal received and interpreted by said communications circuit from said common communications link, the state of said output switch determines the ON or OFF status of said pilot by passing or blocking an electrical current flow to said bulb socket terminals.

25. The integrated pilot light module of claim 24 wherein said pilot light is a LED module.

26. The integrated pilot light module of claim 24 wherein said pilot light is a low voltage incandescent light.

27. The integrated pilot light module of claim 24 wherein said output switch is a switching transistor.

28. The integrated pilot light module of claim 24 wherein said output switch is an electronic relay.

\* \* \* \* \*